United States Patent [19]

Aoyagi et al.

[11] Patent Number: 5,228,725
[45] Date of Patent: Jul. 20, 1993

[54] PRESSURE OIL LEND-IN PORTION OF HYDRAULIC APPARATUS

[75] Inventors: Shinji Aoyagi; Yoshiharu Aizawa, both of Saitama, Japan

[73] Assignee: Akebono Brake Industry Co., Ltd., Tokyo, Japan

[21] Appl. No.: 804,458

[22] Filed: Dec. 10, 1991

[30] Foreign Application Priority Data

Dec. 28, 1990 [JP] Japan ............................ 2-405247[U]

[51] Int. Cl.⁵ ............................................. F16L 3/04
[52] U.S. Cl. ................................ 285/158; 285/220; 285/910
[58] Field of Search ............. 285/220, 190, 910, 158, 285/45

[56] References Cited

U.S. PATENT DOCUMENTS

| | | | |
|---|---|---|---|
| 2,307,328 | 1/1943 | Martin | 285/190 |
| 3,124,366 | 3/1964 | Hillman | 285/910 X |
| 4,679,829 | 7/1987 | Yanagisawa | 285/190 |
| 5,011,192 | 4/1991 | Campo | 285/190 X |

FOREIGN PATENT DOCUMENTS

1193375  5/1970  United Kingdom .
2229507  9/1990  United Kingdom .

*Primary Examiner*—Dave W. Arola
*Attorney, Agent, or Firm*—Cushman, Darby & Cushman

[57] ABSTRACT

The oil tightness between a union and a seat portion on the outer side surface of a caliper is maintained by a copper packing. A rubber packing is provided on the outside of the copper packing so as to prevent water drops from adhering to the copper packing. As a result, copper ions never dissolves into the water drops, so that the aluminum caliper is prevented from corroding.

3 Claims, 2 Drawing Sheets

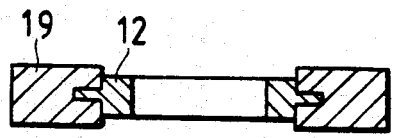
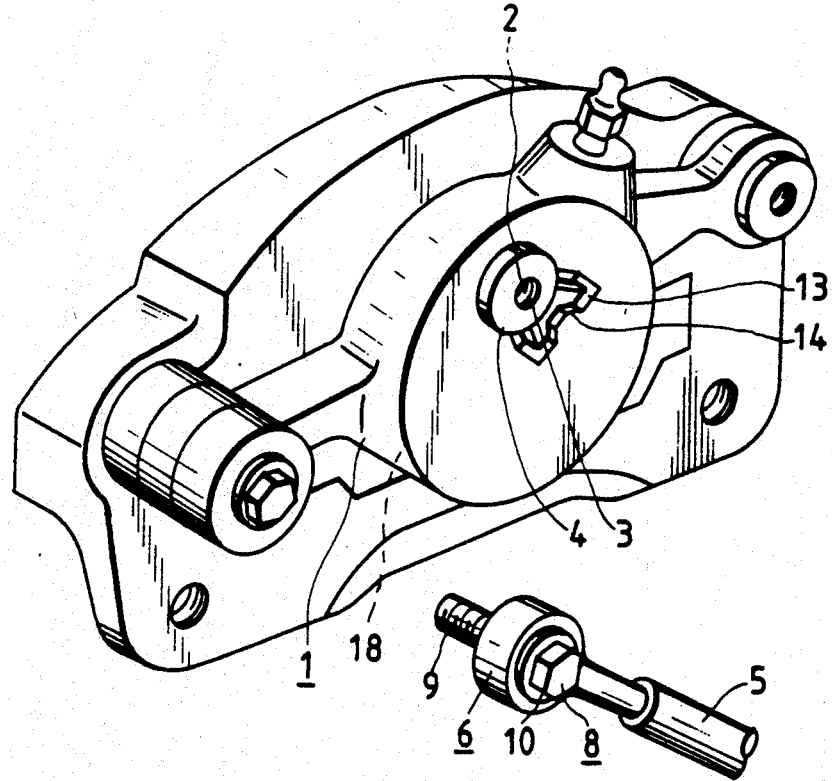
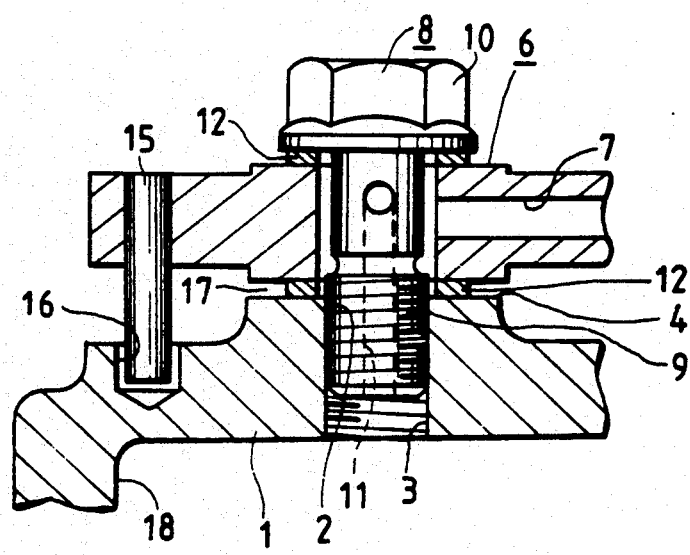

PRESSURE OIL LEND-IN PORTION OF HYDRAULIC APPARATUS

BACKGROUND OF THE INVENTION

The present invention relates to an improvement of a pressure oil lead-in portion for feeding pressure oil, at the time of braking, into a cylinder portion provided in a caliper, that is, a body of a hydraulic apparatus, for example, a disc brake for braking a vehicle, thereby expecting to prevent oil leakage due to rust from occurring.

In a disc brake used for braking a vehicle, a pair of pads are provided so as to sandwich a rotor which rotates together with a vehicle wheel. The pads in pair are caused to press the opposite side surfaces of the rotor by a piston pushed out by oil pressure at the time of braking.

FIG. 4 shows an example of an pressure oil lead-in portion for feeding an oil pressure generated by depression of a braking pedal into a caliper having a piston therein.

A caliper 1 made of aluminum (the term "aluminum" means aluminum or an aluminum alloy, and this applies to the whole of this specification) has a cylinder portion 18 therein. An oil passage hole 2 for connecting the cylinder portion 18 to the outside of the caliper 1 is formed in a side wall of the caliper 1. A female screw 3 is formed in an inner circumferential surface of the oil passage hole 2. Further, a seat portion 4 is formed at a circumferential portion of the oil passage hole 2 on the outer side surface of the caliper 1. The seat portion 4 is finished to have a mirror surface. An annular union 6 is provided at an end of a pressure oil feeding/discharging pipe 5 communicating with a pressure oil feeding means such as a master cylinder or the like. As shown in FIG. 5, an end of a path 7 communicating with the pressure oil feeding/discharging pipe 5 is opened in the inner circumferential surface of the union 6.

Such a union 6 is fixed to the seat portion 4 by a union bolt 8 engaging with the female screw 3 on the inner circumferential surface of the oil passage hole 2. The union bolt 8 is constituted by a rod portion 9 having a diameter smaller than an inner diameter of the union 6 and a head portion 10 having a diameter larger than the inner diameter of the union 6. An oil path 11 is formed inside the rod portion 9 so that the path 11 has opposite ends opened in a middle portion side surface of the rod portion 9 and in an end surface of the same, respectively. Further, copper packings 12 and 12 are sandwiched between the seat portion 4 and the union 6 and between the union 6 and the head portion 10 of the union bolt 8 respectively to thereby prevent the pressure oil from leaking through the respective gaps.

In braking, pressure oil fed inside the union from the pressure oil feeding/discharging pipe 5 through the oil path 7 is further fed into the cylinder portion 18 of the caliper 4 through the oil path 11 and the oil passage hole 2 to thereby push out the piston fitted on the cylinder portion 18 to thereby perform braking.

When the union bolt 8 is firmly screwed into the female screw 3, the union 6 is prevented from rotating by the engagement between the pressure oil feeding/discharging pipe 5 and a notch 14 formed in a wall portion 13 at an end portion of the seat portion 4 in the case of the structure shown in FIG. 4, and by the engagement between a pin 15 fixed to a top end portion of the union 6 and an engagement hole 16 formed in an outer side surface of the caliper 1 in the case of the structure shown in FIG. 5.

There are however following problems to be solved in the conventional pressure oil lead-in portion of the disc brake having a configuration so as to operate as described above.

That is, since aluminum and copper which are different in electric potential from each other form a set of battery under the existence of water, if water drops such as rain water or the like adhere to the inside of a fine gap 17 existing between the seat portion 4 and the union 6, corrosion due to an oxidation reaction is generated on the caliper 1 made of aluminum which is base metal.

In the case where such corrosion of the caliper 1 is left as it is, the cylinder portion 18 provided in the caliper 1 becomes communicated with outside so that it becomes impossible to heighten the inside pressure of the cylinder 18 and it becomes therefore impossible to perform braking.

SUMMARY OF THE INVENTION

A pressure oil lead-in portion of a disc brake according to the present invention has been attained in order to eliminate the disadvantage as described above, and an object of the present invention is to prevent water drops from adhering to copper packings 12 so as to prevent an aluminum caliper from corroding at portions where the packings 12 are disposed to thereby improve the reliability and endurance of the disc brake.

According to the present invention, a pressure oil lead-in portion of a hydraulic apparatus comprises: an aluminum body having a cylinder poriton therein; an oil passage hole formed in a side wall of the aluminum body for leading pressure oil into the cylinder portion; a female screw formed in an inner circumferential surface of the oil passage hole; a seat portion formed at a circumferential portion of the oil passage hole on an outer side surface of the body; a pressure oil feeding/discharging pipe communicated with a pressure oil feeding member; an annular union provided at one end of the pressure oil feeding/discharging pipe, the union having an inner circumferential surface in which a path communicated with the pressure oil feeding/discharging pipe is opened; a union bolt engaged with the female screw so as to fix the union to the seat portion, the union bolt having a rod portion; an oil path having opposite ends which are opened in a middle side surface and an end surface of the rod portion, respectively; a copper packing sandwiched between the seat portion and the union; and member for preventing water drops from adhering to the copper packing.

Further, the pressure oil lead-in portion of a disc brake according to the present invention is characterized in that the member for preventing water drops from adhering to the copper packing comprises a rubber packing which is sandwiched between the seat portion and the union and disposed on the outer-side portion of the copper packing.

The operation per se of feeding pressure oil into the cylinder portion of the caliper at the time of braking by means of the pressure oil lead-in portion of a disc brake according to the present invention having a configuration as described above is the same as that of the conventional pressure oil lead-in portion of a disc brake described above.

Further, in the case of the pressure oil lead-in portion of a disc brake according to the present invention, water drops such as rain water or the like are prevented from adhering to the copper packing 12 by the existence of the rubber packing 19 provided on the outside portion of the copper packing 12. Accordingly, copper ions are never solved into the water drops which adhere to the aluminum caliper 1, so that corrosion of the caliper 1 is not advanced in the early time.

BREIF DESCRIPTION OF THE DRAWINGS

FIG. 3 is a sectional view showing another example of packing;

FIG. 4 is a perspective view showing a disc brake having a pressure oil lead-in portion which is a subject of the present invention, and showing the pressure oil lead-in portion in the exploded state; and FIG. 5 is a sectional view of a conventional pressure oil lead-in portion.

DETAILED DESCRIPTION OF THE PREFERRED EMBODIMENTS

Figure 1:
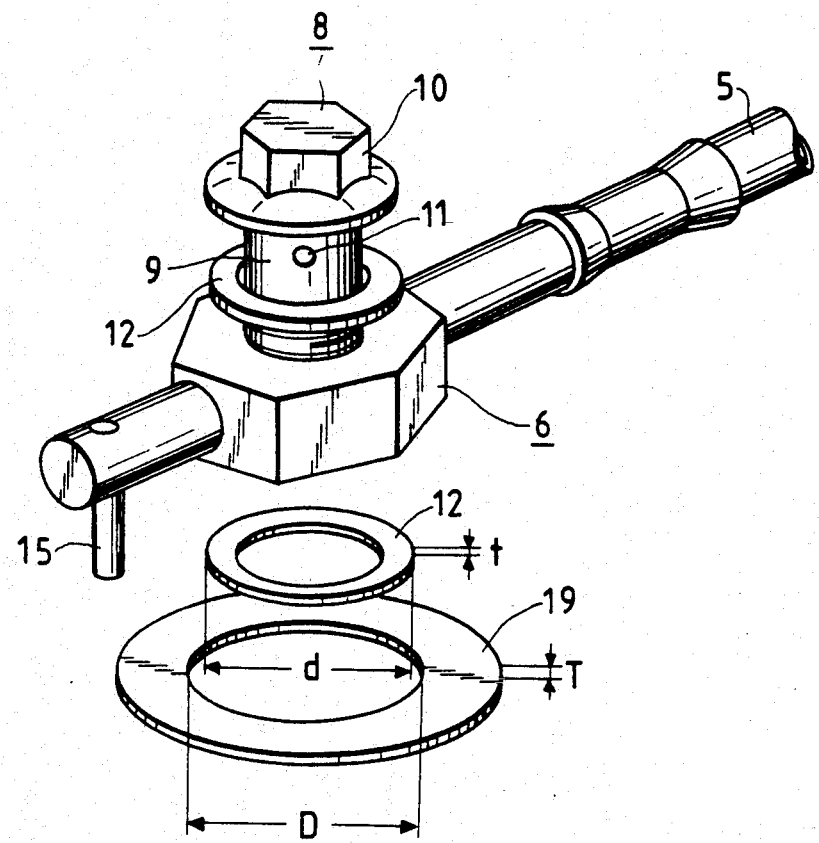
FIG. 1 is an exploded perspective view showing an embodiment of the present invention.

An embodiment of the present invention illustrated in FIGS. 1 and 2 will be described hereunder. Similarly to the conventional pressure oil lead-in portion of a disc brake described above, an oil passage hole 2 for making a cylinder portion 18 communicated with the outside of a caliper 1 is formed in a side wall of the aluminum caliper 1 having the cylinder portion 18 (FIGS. 4 and 5) therein, and a female screw 3 is formed in the inner circumferential surface of the oil passage hole 2. Further, a seat portion 4 is formed at the circumferential portion of the oil passage hole 2 on the outside surface of the caliper 1, and the seat portion 4 is finished to have a mirror surface. An annular union 6 is provided on one end of a pressure oil feeding/discharging pipe 5 communicating with pressure oil feeding means such as a master cylinder or the like, and one end of a path 7 communicating with the pressure oil feeding/discharging pipe is opened in the union 6 at its inner circumferential surface.

Such a union 6 is fixed to the seat portion 4 by a union bolt 8 engaging with the female screw 3 on the inner circumferential surface of the oil passage hole 2. The union bolt 8 is constituted by a rod portion 9 having a diameter smaller than an inner diameter of the union 6 and a head portion 10 having a diameter larger than the inner diameter of the union 6. An oil path 11 is formed inside the rod portion 9 so that the path 11 has opposite ends opened in a middle portion side surface of the rod portion 9 and in an end surface of the same, respectively. Further, copper packings 12 and 12 are sandwiched between the seat portion 4 and the union 6 and between the union 6 and the head portion 10 of the union bolt 8 respectively to thereby prevent the pressure oil from leaking through the respective gaps.

Although the configuration described above is similar to the pressure oil lead-in portion of the conventional disc brake described above, the pressure oil lead-in portion of the disc brake according to the present invention is provided with a lump of rubber packing 19 in addition to the above configuration. That is, the rubber packing 19 has an inner diameter D larger than an outer diameter d of the copper packing 12, is provided on the outside portion of the copper packing 12, and is sandwiched by the seat portion 4 and the union 6. Further, the thickness dimension T of the rubber packing 19 in a free state is made larger than the thickness dimension t of the copper packing 12, so that in the case where the oil-tight state between the seat portion 4 and the union 6 is maintained by the copper packing 12, the water-tight state at the copper packing 19 set portion is sufficiently maintained by sufficiently pressing the rubber packing 19.

The operation per se of feeding pressure oil into the cylinder portion of the caliper at the time of braking by means of the pressure oil lead-in portion of a disc brake according to the present invention having a configuration as described above is the same as that of the conventional pressure oil lead-in portion of a disc brake described above.

That is, in braking, the pressure oil sent from the master cylinder as a braking pedal is depressed, is fed from the pressure oil feeding/exhausting pipe 5 into the union through the path 7, and further the pressure oil is fed into the cylinder 18 through the oil path 11 and the oil passage hole 2 to thereby push out a piston fittingly provided on the cylinder portion 18 so as to perform braking.

Further, in the case of the pressure oil lead-in portion of a disc brake according to the present invention, water drops such as rain water or the like are prevented from adhering to the copper packing 12 by the existence of the rubber packing 19 provided on the outside portion of the copper packing 12. Accordingly, copper ions are never solved into the water drops which adhere to the aluminum caliper 1, so that corrosion of the caliper 1 is not advanced in the early time.

Figure 2:
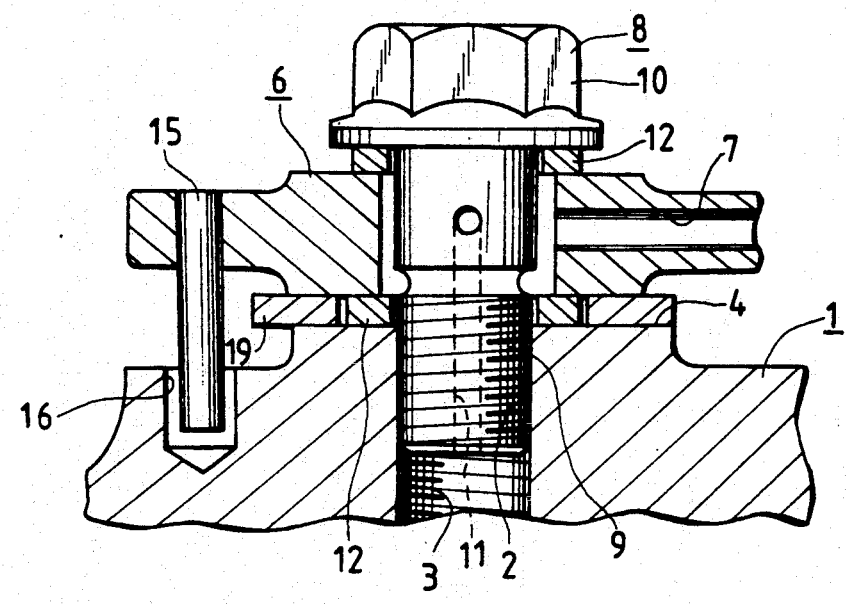
FIG. 2 is a sectional view showing the state in which the structure of FIG. 1 is assembled.

Although the copper packing 12 and the rubber packing 19 may be separately provided as shown FIGS. 1 and 2, if the rubber packing 19 is integrally combined with the copper packing 12 at its circumference as shown in FIG. 3, parts management and parts assembling work of the packings 12 and 19 become easy.

The pressure oil lead-in portion of a disc brake according to the present invention is made to have a configuration so as to operate as described above to prevent the aluminum caliper from corroding to thereby improve the reliability and endurance of the disc brake.

What is claimed is:

1. A pressure oil lead-in portion of a hydraulic apparatus comprising:
   an aluminum body including a cylindrical portion having a threaded oil passage hole therein and a seat portion about said hole;
   a pressure oil feeding/discharging pipe adapted to supply pressurized oil from a source thereof;
   an annular union provided at one end of said pressure oil feeding/discharging pipe, said union having a oil path therethrough in communication with said pressure oil feeding/discharging pipe;
   bolting means for fixing said union to said seat portion, said bolting means being engageable with said threads provided in said oil passage hole, said bolting means having a rod portion with a bore therethrough to form an oil path in communication with said oil passage hole and with said oil path of said union;
   a copper packing having an opening therethrough to allow said rod portion to pass therethrough and thereby permit the flow of pressure oil between said union and said oil passage hole, said copper packing being disposed between said seat portion and said union such that said copper packing is in oil-tight sealing contact with said seat portion and said union; and means for preventing water from coming into contact with said copper packing.

2. A pressure oil lead-in portion of a hydraulic apparatus, according to claim 1, wherein said preventing means comprises a rubber packing disposed between said seat portion and said union so as to form a watertight seal therebetween, said rubber packing also being disposed about a radially outer-side portion of said copper packing.

3. A pressure oil lead-in portion of a hydraulic apparatus, according to claim 2, wherein said copper packing is formed with said rubber packing at its circumference.

* * * * *